(12) United States Patent
Ono et al.

(10) Patent No.: US 11,276,897 B2
(45) Date of Patent: Mar. 15, 2022

(54) STACKED BATTERY AND BATTERY MODULE

(71) Applicant: Envision AESC Japan Ltd., Kanagawa (JP)

(72) Inventors: Masato Ono, Kanagawa (JP); Keigo Atobe, Kanagawa (JP); Hatsuna Seshita, Kanagawa (JP); Aika Kimura, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 0 days.

(21) Appl. No.: 16/642,591

(22) PCT Filed: Aug. 13, 2018

(86) PCT No.: PCT/JP2018/030218
§ 371 (c)(1),
(2) Date: Feb. 27, 2020

(87) PCT Pub. No.: WO2019/054115
PCT Pub. Date: Mar. 21, 2019

(65) Prior Publication Data
US 2020/0350529 A1    Nov. 5, 2020

(30) Foreign Application Priority Data

Sep. 14, 2017 (JP) .............................. JP2017-177132

(51) Int. Cl.
*H01M 50/20* (2021.01)
*H01M 50/116* (2021.01)
(Continued)

(52) U.S. Cl.
CPC ........... *H01M 50/20* (2021.01); *H01M 10/04* (2013.01); *H01M 10/056* (2013.01);
(Continued)

(58) Field of Classification Search
CPC ... H01M 50/20; H01M 50/124; H01M 50/531
See application file for complete search history.

(56) References Cited

U.S. PATENT DOCUMENTS

2011/0086262 A1 * 4/2011 Kim .................... H01M 50/116
                                                                       429/178
2012/0077075 A1   3/2012 Tani et al.
(Continued)

FOREIGN PATENT DOCUMENTS

JP    2004-179053 A    6/2004
JP    2009-211949 A    9/2009
(Continued)

OTHER PUBLICATIONS

International Search Report issued in corresponding International Patent Application No. PCT/JP2018/030218 dated Sep. 11, 2018.

*Primary Examiner* — Kenneth J Douyette
(74) *Attorney, Agent, or Firm* — Morgan, Lewis & Bockius LLP

(57) ABSTRACT

A stacked battery includes: a power generation element in which a plurality of electrodes and a plurality of separators are alternately stacked; an exterior member in which the power generation element is accommodated together with an electrolytic solution; and a bonding portion configured to bond an outermost layer of the power generation element and an inner side of the exterior member, wherein when the power generation element is viewed in a plan view from a stacking direction in which the electrodes and the separators are stacked, the bonding portion is located outside an effective region contributing to power generation in the power generation element and has a shape in which an outer peripheral edge of the bonding portion is continuous over an entire circumference of the bonding portion.

14 Claims, 4 Drawing Sheets

(51) Int. Cl.
    *H01M 50/124*     (2021.01)
    *H01M 10/04*     (2006.01)
    *H01M 10/056*     (2010.01)
    *H01M 50/46*     (2021.01)
    *H01M 50/531*     (2021.01)

(52) U.S. Cl.
    CPC ....... *H01M 50/116* (2021.01); *H01M 50/124* (2021.01); *H01M 50/461* (2021.01); *H01M 50/531* (2021.01)

(56) References Cited

U.S. PATENT DOCUMENTS

2012/0321932 A1    12/2012  Ise et al.
2017/0069881 A1*   3/2017  Kwon ............... H01M 10/0436

FOREIGN PATENT DOCUMENTS

| | | |
|---|---|---|
| JP | 2013-012428 A | 1/2013 |
| WO | 2013/047778 A1 | 4/2013 |
| WO | 2016/152922 A1 | 9/2016 |

\* cited by examiner

STACKED BATTERY AND BATTERY MODULE

TECHNICAL FIELD

The present disclosure relates to a stacked battery and a battery module.

BACKGROUND

A stacked battery includes a power generation element in which a plurality of electrodes and a plurality of separators are alternately stacked, an exterior member that accommodates the power generation element, and positive and negative tabs electrically connected to the power generation element and led out of the exterior member. The exterior member seals the power generation element as the peripheral edge portions thereof are overlapped and bonded.

A stacked battery in which a power generation element is wrapped together with an electrolytic solution by a bag-like insulating sheet is known (see Patent Document 1). In this stacked battery, the power generation element and the electrolytic solution are wrapped in a bag-like insulating sheet and stored in an exterior member. With this configuration, metal powder such as welding spatter or dust is prevented from being mixed into the power generation element or the electrolytic solution during production, whereby short-circuiting between electrodes in the power generation element is prevented.

PRIOR ART DOCUMENT

Patent Document

Patent Document 1: Japanese laid-open publication No. 2013-12428

However, even if a foreign substance cannot be detected at a short-circuit inspection stage, there is a possibility that the foreign substance mixed into the bag-like insulating sheet is moved to between the insulating sheet and the outermost layers of the power generation element as the electrolytic solution flows after short-circuit inspection. As a result, there is a possibility that a short circuit occurs in the power generation element.

The present invention provides some embodiments of a stacked battery capable of preventing a short circuit in a power generation element even when a foreign substance is moved as an electrolytic solution flows, and a battery module including such a stacked battery.

SUMMARY

According to one embodiment of the present disclosure, there is provided a stacked battery, including: a power generation element in which a plurality of electrodes and a plurality of separators are alternately stacked; an exterior member in which the power generation element is accommodated together with an electrolytic solution; and a bonding portion configured to bond an outermost layer of the power generation element and an inner side of the exterior member. When the power generation element is viewed in a plan view from a stacking direction in which the electrodes and the separators are stacked, the bonding portion is located outside an effective region contributing to power generation in the power generation element and has a shape in which an outer peripheral edge of the bonding portion is continuous over an entire circumference of the bonding portion.

According to another embodiment of the present disclosure, there is provided a battery module including at least one stacked battery mentioned above, including: a holding member configured to sandwich and hold the stacked battery from both sides in the stacking direction; a pressing part configured to apply a pressing force to the stacked battery in the stacking direction; and a module bonding portion configured to bond the stacked battery to the holding member. When the stacked battery is viewed in the plan view from the stacking direction, the bonding portion bonds the outermost layer of the power generation element and the inner side of the exterior member in a region that does not overlap with a region in which the pressing part and the module bonding portion are present.

DETAILED DESCRIPTION

Figure 1:
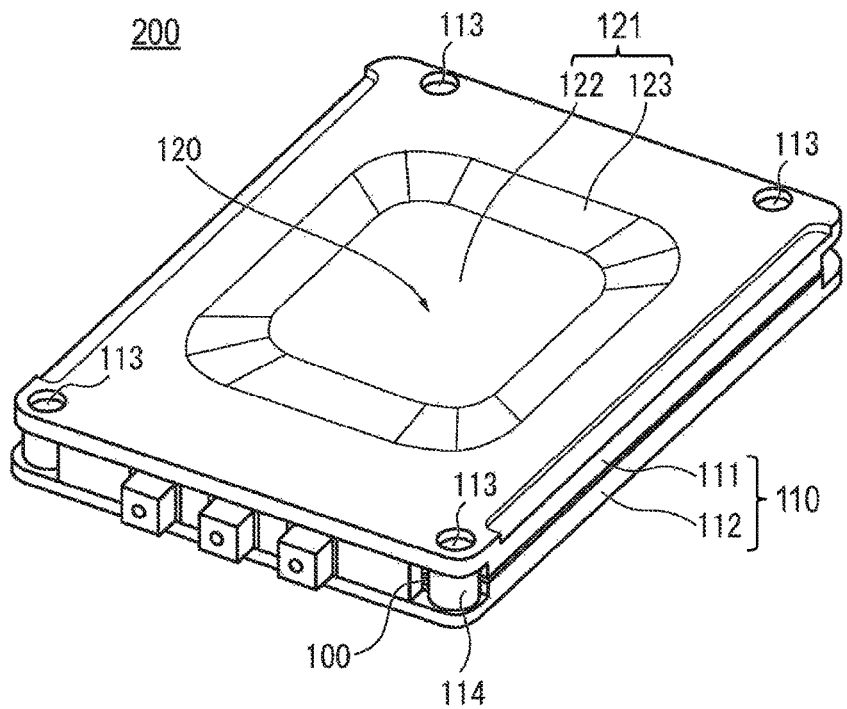
FIG. 1 is a perspective view showing a battery module.

Embodiments and modifications thereof will be described below with reference to the accompanying drawings. In the description of the drawings, the same elements are denoted by like reference numerals, and the redundant description thereof is omitted. The size and ratio of each member in the drawings may be exaggerated for the convenience of explanation and may be different from the actual size and ratio.

Figure 2:
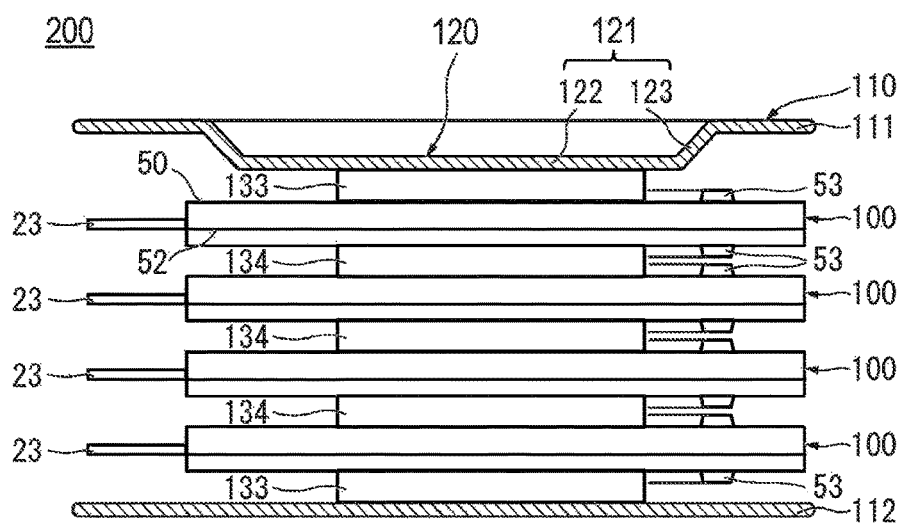
FIG. 2 is a schematic sectional view showing the battery module.
Figure 3:
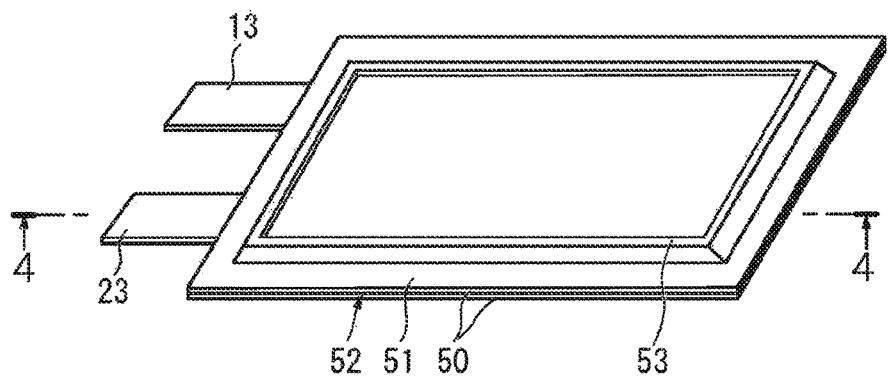
FIG. 3 is a perspective view showing a stacked battery.
Figure 4:
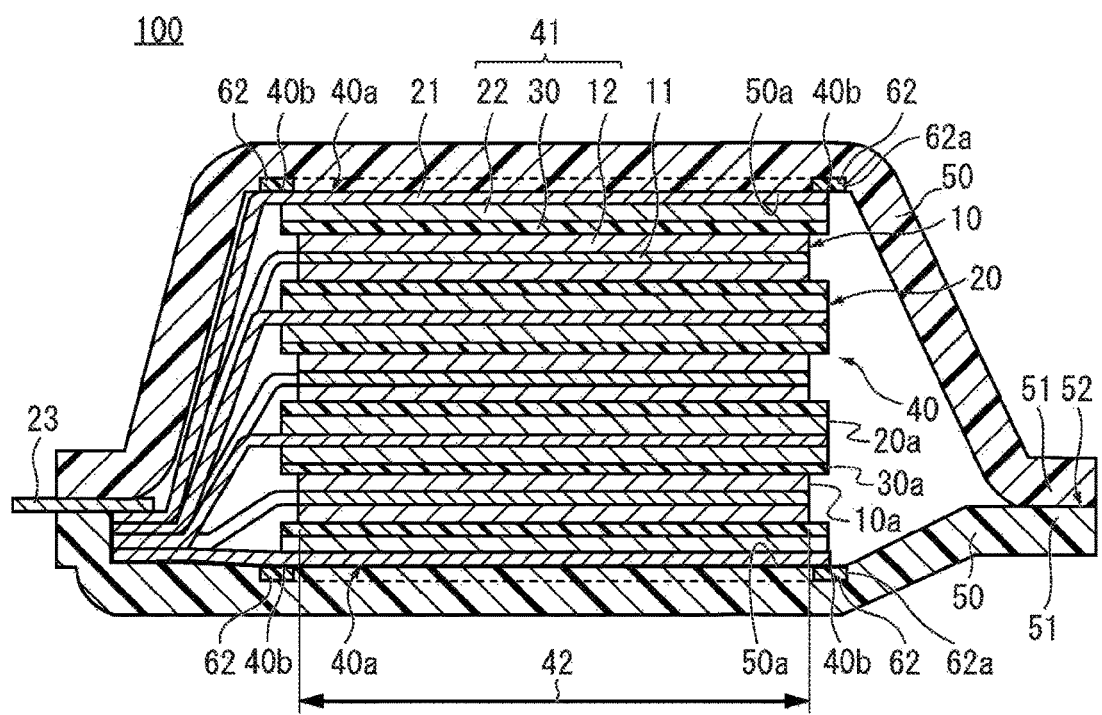
FIG. 4 is a sectional view taken along line 4-4 in FIG. 3.
Figure 5:
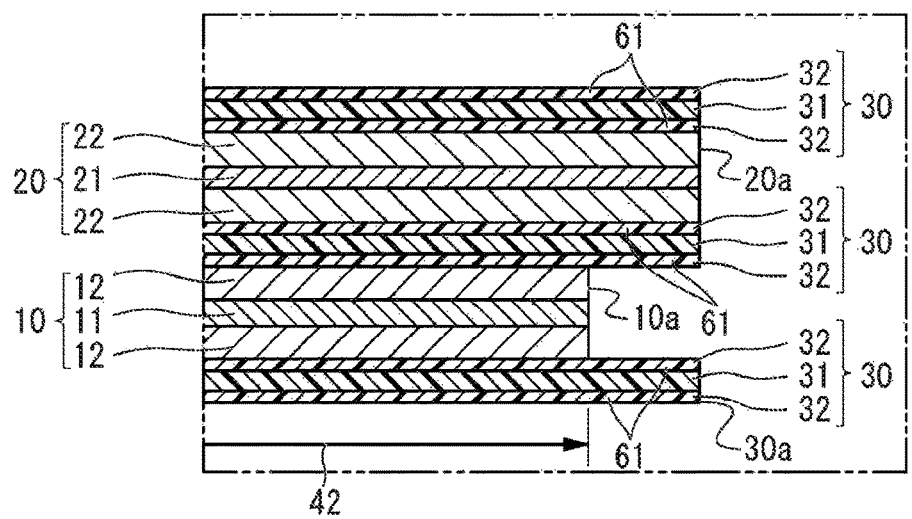
FIG. 5 is an enlarged sectional view showing a main part of a power generation element.
Figure 6:
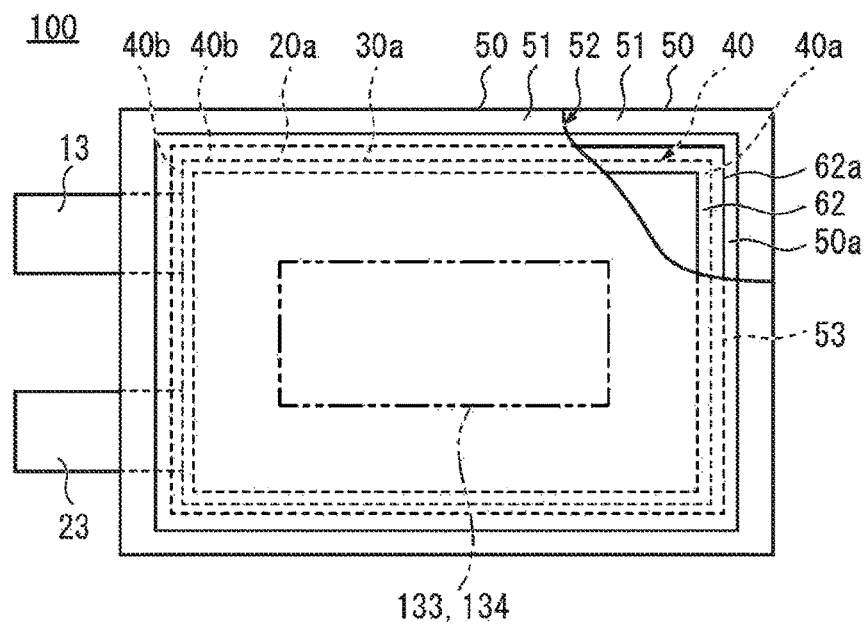
FIG. 6 is a plan view showing the stacked battery in a state in which a part of an outer layer member is cut away.

FIG. 1 is a perspective view showing a battery module 200. FIG. 2 is a schematic sectional view showing the battery module 200. FIG. 3 is a perspective view showing a stacked battery 100. FIG. 4 is a sectional view taken along line 4-4 in FIG. 3. FIG. 5 is an enlarged sectional view showing the main part of FIG. 4. FIG. 6 is a plan view showing the stacked battery 100 in a state in which a part of an outer layer member is cut away. In the following description, the term "stacking direction" refers to a direction in which electrodes and separators are stacked in the stacked battery 100. The stacked battery 100 of the present embodiment has a flat shape. The direction in which a plurality of stacked batteries 100 is stacked coincides with the stacking direction in which the electrodes and the separators are stacked.

Referring to FIGS. 1 and 2, the illustrated battery module 200 includes a plurality of stacked batteries 100 and a holding member 110 that sandwiches and holds the stacked batteries 100 from both sides in the stacking direction.

(Stacked Battery 100)

First, the stacked battery 100 will be described. Referring to FIGS. 3 to 6, in general, the stacked battery 100 includes a power generation element 40 in which a plurality of electrodes 10 and 20 and a plurality of separators 30 are alternately stacked, and an exterior member 50 that accommodates the power generation element 40 together with an electrolytic solution (see FIGS. 3 and 4). The stacked battery 100 includes first bonding portions 61 (corresponding to "additional bonding portions") for bonding the electrodes 10 and 20 and the separator 30 (see FIG. 5). The stacked battery 100 includes second bonding portions 62 (corresponding to "bonding portions") for bonding the outermost layers 40a of the power generation element 40 and the inner side 50a of the exterior member 50 (see FIGS. 4 and 6). The exterior member 50 includes a joint portion 52 in which the peripheral edge portions 51 are overlapped and joined (see FIGS. 4 and 6). When the power generation element 40 is viewed in a plan view from the stacking direction, the second bonding portion 62 is located in a region outside an effective region 42 that contributes to power generation in the power generation element 40. The second bonding portion 62 has such a shape that the outer peripheral edge 62a thereof is continuous over the entire circumference (see FIGS. 4 and 6). In the following description, the stacked battery 100 is also simply referred to as "unit cell 100". Details will be described below.

Referring to FIGS. 4 and 5, the power generation element 40 includes a positive electrode 10 in which a positive electrode active material layer 12 is disposed on at least one surface of a positive electrode current collector 11, a negative electrode 20 in which a negative electrode active material layer 22 is disposed on at least one surface of a negative electrode current collector 21, and a separator 30 for holding an electrolytic solution. A unit cell layer 41 is formed by causing the positive electrode active material layer 12 and the negative electrode active material layer 22 to face each other with the separator 30 interposed therebetween. The power generation element 40 is accommodated in the exterior member 50 in a state where a plurality of unit cell layers 41 is stacked.

A region where the positive electrode active material layer 12, the separator 30 and the negative electrode active material layer 22 overlap one another becomes the effective region 42 that contributes to power generation in the power generation element 40. The effective region 42 that contributes to power generation in the power generation element 40 is simply referred to as "power generation region 42".

The positive electrode current collector 11 has a shape of a thin film made of, for example, aluminum. A positive electrode tab 13 for charging and discharging is connected to the positive electrode current collector 11. The positive electrode active material layer 12 includes a positive electrode active material such as spinel type lithium manganite, lithium nickel manganese cobalt composite oxide having a layered crystal structure, or the like.

The negative electrode current collector 21 has a shape of a thin film made of, for example, copper. A negative electrode tab 23 for charging and discharging is connected to the negative electrode current collector 21. The negative electrode active material layer 22 includes negative electrode active materials. At least one of the negative electrode active materials is selected from the group consisting of graphite, amorphous carbon-coated graphite, silicon (Si), silicon alloy, and silicon oxide. The area of the negative electrode active material layer 22 is larger than the area of the positive electrode active material layer 12. Thus, even if the positions of the positive electrode active material layer 12 and the negative electrode active material layer 22 are shifted relative to each other, the facing area between the positive electrode active material layer 12 and the negative electrode active material layer 22 can be kept constant. Therefore, it is possible to suppress a fluctuation in power generation capacity due to a change in the facing area between the positive electrode active material layer 12 and the negative electrode active material layer 22.

The separator 30 holds an electrolyte contained in the electrolytic solution. The type of the separator 30 is not particularly limited as long as it can hold the electrolyte contained in the electrolytic solution. A conventionally known separator may be appropriately used.

The exterior member 50 accommodates the power generation element 40 together with the electrolytic solution. The exterior member 50 includes a laminate sheet having a three-layer structure. The first innermost layer is formed using a heat-fusible resin such as, for example, polypropylene (PP), polyethylene (PE), ionomer, or ethylene vinyl acetate (EVA). The second layer is formed using a foil-like metal such as, for example, an Al foil or a Ni foil. The third layer is formed using a resinous film such as, for example, rigid polyethylene terephthalate (PET) or nylon.

The exterior member 50 has a joint portion 52 where the peripheral edge portions 51 are overlapped and joined. The joint portion 52 is formed by overlapping and heating the peripheral edge portions 51 of the exterior member 50 so that the first layers of heat-fusible resin are welded to each other.

Referring to FIG. 5, the first bonding portions 61 bond the electrodes 10 and 20 (the positive electrode 10 and the negative electrode 20) and the separators 30. Thus, the gap between the positive electrode 10 and the separator 30 at the outer peripheral edge 10a of the positive electrode 10 is closed by the first bonding portion 61. The gap between the negative electrode 20 and the separator 30 at the outer peripheral edge 20a of the negative electrode 20 is closed by the first bonding portion 61. As a result, even if the electrolytic solution in the exterior member 50 flows, the foreign substance mixed into the exterior member 50 does not move to the power generation region 42 between the electrodes 10 and 20 and the separator 30.

The constituent material of the first bonding portions 61 is not limited as long as they can bond the electrodes 10 and 20 and the separator 30. The first bonding portions 61 are formed, for example, on both surfaces of a separator base material 31 (corresponding to a "base material of a separator") and are formed of a bonding layer 32 containing a bonding material. The bonding layer 32 is provided over the entire surface or a part of the surface of the separator base material 31. As the separator base material 31, it may be possible to use, for example, a porous sheet, a nonwoven fabric or the like made of a polymer or fiber that absorbs and holds the electrolyte contained in the electrolytic solution. The bonding material constituting the bonding layer 32 is not limited as long as it can bond the positive electrode active material layer 12 and the separator base material 31 and can bond the negative electrode active material layer 22 and the separator base material 31. As the bonding material, it may be possible to use, for example, an olefin-based resin such as polyethylene (PE), polypropylene (PP) or the like, a (meth) acryl-based resin such as polymethyl acrylate (PMA), polymethyl methacrylate (PMMA) or the like, and a fluorine resin such as polyvinylidene fluoride (PVdF), polyvinyl fluoride (PVF) or the like. The bonding material of the bonding layer 32 that bonds the positive electrode 10 and the separator base material 31 may be the same as or different from the bonding material of the bonding layer 32 that bonds the negative electrode 20 and the separator base material 31.

The separator 30 has such a size that the outer peripheral edge 30a thereof does not protrude laterally beyond the outer peripheral edges 10a and 20a of the electrodes 10 and 20 (the outer peripheral edge 20a of the larger negative electrode 20 in the illustrated example). In the illustrated example, the first bonding portions 61 also have such a size that does not protrude laterally beyond the outer peripheral edge 20a of the negative electrode 20.

The first bonding portions 61 are disposed between the positive electrode 10 and the separator 30 and between the negative electrode 20 and the separator 30.

Referring to FIG. 4, the second bonding portions 62 bond the outermost layers 40a of the power generation element 40 and the inner side 50a of the exterior member 50. The constituent material of the second bonding portions 62 is not limited as long as it can bond the outermost layers 40a of the power generation element 40 and the inner side 50a of the exterior member 50. The second bonding portions 62 include, for example, bonding agents, adhesives or double-sided tapes. The bonding material constituting the bonding agents, the bonding material constituting the adhesives, or the bonding material constituting the bonding layers in the double-sided tapes may be the above-mentioned bonding material constituting the bonding layers 32 in the first bonding portions 61.

The outermost layer 40a of the power generation element 40 shown in FIG. 4 is the negative electrode current collector 21. The outermost layer 40a of the power generation element 40 is not limited to this case. In addition to the illustrated negative electrode current collector 21, the negative electrode active material layer 22, the positive electrode current collector 11, the positive electrode active material layer 12 or the separator 30 is positioned in the outermost layer 40a of the power generation element 40. Therefore, the second bonding portions 62 bond the illustrated negative electrode current collector 21 and the inner side 50a of the exterior member 50, and also bond the negative electrode active material layer 22, the positive electrode current collector 11, the positive electrode active material layer 12 or the separator 30 and the inner side 50a of the exterior member 50.

Next, the shape and size of the second bonding portion 62 will be described with reference to FIGS. 4 and 6. When the power generation element 40 is viewed in a plan view from the stacking direction, the second bonding portion 62 is located in a region outside the power generation region 42 and has such a shape that the outer peripheral edge 62a thereof is continuous over the entire circumference. Due to the shape and size of the second bonding portion 62, even if the electrolytic solution in the exterior member 50 flows, the foreign substance mixed into the exterior member 50 does not move to the power generation region 42 between the outermost layer 40a of the power generation element 40 and the inner side 50a of the exterior member 50.

In this regard, the expression "the shape that the outer peripheral edge 62a of the second bonding portion 62 is continuous over the entire circumference" is not limited to a case where the outer peripheral edge 62a of the second bonding portion 62 is continuous by means of a single member. For example, the expression should be construed to include a case where the second bonding portion 62 is configured to be divided into a plurality of small pieces and the outer peripheral edge 62a is made continuous over the entire circumference by combining the small pieces.

When the power generation element 40 is viewed in a plan view from the stacking direction, the second bonding portion 62 has such a size that covers the edge portion 40b of the outermost layer 40a of the power generation element 40. By covering the edge portion 40b with the second bonding portion 62, the edge portion 40b of the power generation element 40 can be prevented from biting into the inner side 50a of the exterior member 50. As a result, the exterior member 50 can be protected from the edge portion 40b of the power generation element 40.

Furthermore, when the power generation element 40 is viewed in a plan view from the stacking direction, the second bonding portion 62 has such a size that the outer peripheral edge 62a of the second bonding portion 62 is positioned inside the joint portion 52 without being sandwiched by the joint portion 52. It is not necessary to consider the point at which the second bonding portion 62 is joined to the exterior member 50, and it is only necessary to consider ensuring the function of protecting the exterior member 50 from the edge portion 40b. Therefore, the size of the second bonding portion 62 and the exterior member 50 can be made as small as possible. As a result, the ratio of the volume of the power generation element 40 to the volume of the exterior member 50 increases.

The second bonding portion 62 has a frame shape when the power generation element 40 is viewed in a plan view from the stacking direction. The second bonding portion 62 may have a surface shape. However, the material cost can be reduced by adopting the frame shape instead of the surface shape.

In addition, the rectangular shape shown by a two-dot chain line in FIG. 6 indicates the position where third bonding portions 133 and fourth bonding portions 134 to be used when forming a battery module 200 are located.

(Battery Module 200)

Next, the configuration of the battery module 200 will be described with reference to FIGS. 1 and 2 again. In summary, the battery module 200 includes a plurality of unit cells 100, a holding member 110 that sandwiches and holds the unit cells 100 from both sides in the stacking direction, and a pressing part 120 provided in the holding member 110 and configured to urge the unit cells 100 with a pressing force acting along the stacking direction. The battery module 200 further includes third bonding portions 133 (corresponding to "module bonding portions") that bonds the unit cells 100 to the holding member 110 and fourth bonding portions 134 (corresponding to "additional module bonding portions"). When the unit cells 100 are viewed in a plan view from the stacking direction, the second bonding portions 62 bond the outermost layers 40a of the power generation element 40 and the inner side 50a of the exterior member 50 in a region that does not overlap with the region where the pressing part 120 and the third bonding portions 133 are present (see also FIGS. 4 and 5). Furthermore, when the unit cells 100 are viewed in a plan view from the stacking direction, the second bonding portions 62 bond the outermost layers 40a of the power generation element 40 and the inner side 50a of the exterior member 50 in a region that does not overlap with the region where the fourth bonding portions 134 are present (see also FIG. 6). Details will be described below.

The unit cells 100 have a flat shape. The direction in which the unit cells 100 are stacked coincides with the stacking direction in which the electrodes 10 and 20 and the separators 30 are stacked. In FIG. 2, the portions indicated by reference numeral 53 exaggerate the bulges that appear on the surfaces of the exterior members 50 by providing the second bonding portions 62. The dimension of the bulges 53 of the exterior members 50 is about 30 μm on one side.

The holding member 110 includes an upper holding member 111 and a lower holding member 112. The upper holding member 111 and the lower holding member 112 have a plate shape and are made of a metallic material such as aluminum or the like. The upper holding member 111 and the lower holding member 112 have through holes 113 through which through bolts (not shown) are inserted. Four through holes 113 are formed. The stacked unit cells 100 are sandwiched between the upper holding member 111 and the lower holding member 112 from both sides in the stacking direction. The upper holding member 111 and the lower holding member 112 are fastened by through bolts. In order to receive the axial forces of the through bolts, hollow sleeves 114 into which the through bolts are inserted are disposed between the upper holding member 111 and the lower holding member 112 (see FIG. 1).

The pressing part 120 includes a bulging portion 121 formed at the central portion of the upper holding member 111. The bulging portion 121 bulges toward the stacked unit cells 100. The bulging portion 121 has a concave camber shape. The bulging portion 121 has a pressing surface 122 to which the third bonding portion 133 is attached, and an inclined surface 123 which obliquely extends from the pressing surface 122. The pressing surface 122 of the bulging portion 121 is bonded to the end surface of the uppermost unit cell 100 among the stacked unit cells 100 via the third bonding portion 133. The lowermost unit cell 100 is bonded to the lower holding member 112 through the third bonding portion 133. Then, by fastening the upper holding member 111 and the lower holding member 112, a pressing force acting in the stacking direction is applied to each unit cell 100.

Referring to FIG. 2, the third bonding portions 133 bond the uppermost unit cell 100 and the lowermost unit cell 100 to the holding member 110. Thus, regarding the uppermost unit cell 100 and the lowermost unit cell 100, when the battery module 200 receives an impact, the positions of the unit cells 100 with respect to the holding member 110 can be prevented from being shifted laterally beyond an allowable dimension. The third bonding portions 133 are arranged in the central portions of the uppermost unit cell 100 and the lowermost unit cell 100 (see also the two-dot chain line in FIG. 6).

The constituent material of the third bonding portions 133 is not limited as long as it can bond the unit cells 100 and the holding member 110. The third bonding portions 133 include, for example, bonding agents, adhesives or double-sided tapes. The bonding material constituting the bonding agents, the bonding material constituting the adhesives, or the bonding material constituting the bonding layers in the double-sided tapes may be the above-mentioned bonding material constituting the bonding layers 32 in the first bonding portions 61.

When the unit cells 100 are viewed in a plan view from the stacking direction, the second bonding portions 62 bond the outermost layers 40a of the power generation element 40 and the inner side 50a of the exterior member 50 in a region that does not overlap with the region where the pressing part 120 and the third bonding portion 133 are present (see also FIG. 6). In the case where the second bonding portions 62 exists in a region that overlaps with the region where the pressing part 120 and the third bonding portion 133 are present, the distance between the pressing surface 122 of the pressing part 120 and the end surface of the uppermost unit cell 100 locally becomes small. The pressing force applied to the unit cells 100 is locally increased due to the presence of the second bonding portions 62. When the pressing force is locally increased, the distance between the electrodes 10 and 20 becomes different, thereby causing localization of a reaction and resulting in a decrease in battery performance and a decrease in cycle lifespan. Therefore, in order to make the pressing force applied to the unit cells 100 uniform, the second bonding portions 62 are caused to exist in a region that does not overlap with the region where the pressing part 120 and the third bonding portion 133 are present.

When the pressing part 120 is configured from the camber-shaped bulging portion 121, as shown in FIG. 2, the second bonding portions 62 may exist in the region that overlaps with the region where the inclined surface 123 is present. This is because the inclined surface 123 does not make contact with the unit cell 100 and there is no possibility that the pressing force applied to the unit cell 100 is locally increased.

The thickness of the second bonding portions 62 in the stacking direction is preferably smaller than the thickness of the third bonding portions 133 in the stacking direction. This is because the holding member 110 (the upper holding member 111 and the lower holding member 112) does not make contact with the bulge 53 of the exterior member 50 and there is no possibility that the pressing force applied to the unit cells 100 is locally increased.

The fourth bonding portions 134 bond the unit cells 100 to each other. Thus, when the battery module 200 receives an impact, as for the unit cells 100 other than the uppermost unit cell and the lowermost unit cell, the positions of the unit cells 100 with respect to the holding member 110 can be prevented from being shifted laterally beyond an allowable dimension. The fourth bonding portions 134 have substantially the same size as the third bonding portions 133, and are arranged in the central portions of the unit cells 100 just like the third bonding portions 133 (see also the two-dot chain line in FIG. 6).

The constituent material of the fourth bonding portions 134 is not limited as long as it can bond the unit cells 100 to each other. The fourth bonding portions 134 include, for example, bonding agents, adhesives or double-sided tapes. The bonding material constituting the bonding agents, the bonding material constituting the adhesives, or the bonding material constituting the bonding layers in the double-sided tapes may be the above-mentioned bonding material constituting the bonding layers 32 in the first bonding portions 61.

When the unit cells 100 are viewed in a plan view from the stacking direction, the second bonding portions 62 bond the outermost layers 40a of the power generation element 40 and the inner side 50a of the exterior member 50 in a region that does not overlap with the region where the fourth bonding portions 134 are present (see also FIG. 6). In the case where the second bonding portions 62 exists in a region that overlaps with the region where the fourth bonding portions 134 are present, the distance between the unit cells 100 locally becomes small. The pressing force applied to the unit cells 100 is locally increased due to the presence of the second bonding portions 62. When the pressing force is locally increased, the distance between the electrodes 10 and 20 becomes different, thereby causing localization of a reaction and resulting in a decrease in battery performance and a decrease in cycle lifespan. Therefore, in order to make the pressing force applied to the unit cells 100 uniform, the second bonding portions 62 are caused to exist in a region that does not overlap with the region where the fourth bonding portions 134 are present.

The thickness of the second bonding portions 62 in the stacking direction is preferably smaller than ½ (a half) of the thickness of the fourth bonding portions 134 in the stacking direction. This is because the adjacent unit cells 100 do not make contact with each other at the portion of the bulge 53 of the exterior member 50 and there is no possibility that the pressing force applied to the unit cells 100 by the pressing part 120 becomes non-uniform. When the adjacent unit cells 100 make contact with each other at the portion of the bulge 53 of the exterior member 50, there is a possibility that a force for separating the adjacent unit cells 100 acts and the pressing force applied to the unit cells 100 becomes uneven.

Next, the operations of the embodiment will be described.

The process of manufacturing the unit cell 100 includes a step of injecting an electrolytic solution into the exterior member 50 that accommodates the power generation element 40. After the electrolytic solution injection step, the power generation element 40 is pressed in the stacking direction or heated in order to develop the adhesiveness of the first bonding portions 61 and the second bonding portions 62. Although the frame-shaped second bonding portions 62 are disposed between the power generation element 40 and the exterior member 50, minute gaps are present between the second bonding portions 62 and the power generation element 40 and between the second bonding portions 62 and the exterior member 50 until the adhesiveness is developed. Moreover, although the first bonding portions 61 are disposed between the electrodes 10 and 20 and the separators 30, minute gaps are present between the first bonding portions 61 and the positive electrode 10 and between the first bonding portions 61 and the negative electrode 20 until the adhesiveness is developed. The electrolytic solution penetrates into the power generation element 40 through the minute gaps. Therefore, even if the first bonding portions 61 and the second bonding portions 62 are arranged, the injection of the electrolytic solution and the penetration of the electrolytic solution into the power generation element 40 are not inhibited. After the adhesiveness of the first bonding portions 61 and the second bonding portions 62 is developed, the minute gaps are closed.

During the period from the start of the electrolytic solution injection to the pressing or heating of the power generation element 40 in the stacking direction, a foreign substance may move to between the power generation element 40 and the exterior member 50 or between the electrodes 10 and 20 and the separators 30. The unit cell in which the foreign substance has moved in this manner is found in a short-circuit inspection performed after the step of injecting the electrolytic solution and is treated as a defective product.

In the unit cell 100 of the present embodiment, the outermost layers 40a of the power generation element 40 and the inner side 50a of the exterior member 50 are bonded by the second bonding portions 62. When the power generation element 40 is viewed in a plan view from the stacking direction, the second bonding portion 62 is located in a region outside the power generation region 42 and has such a shape that the outer peripheral edge 62a thereof is continuous over the entire circumference. Thus, even if the electrolytic solution in the exterior member 50 flows, the foreign substance mixed into the exterior member 50 does not move to the power generation region 42 between the outermost layer 40a of the power generation element 40 and the inner side 50a of the exterior member 50. In the unit cell 100, the electrodes 10 and 20 (the positive electrode 10 and the negative electrode 20) and the separators 30 are bonded by the first bonding portions 61. Thus, even if the electrolytic solution in the exterior member 50 flows, the foreign substance mixed into the exterior member 50 does not move to the power generation region 42 between the electrodes 10 and 20 and the separators 30. Therefore, even when a situation occurs in which a foreign substance moves along with the flow of the electrolytic solution after the short-circuit inspection, it is possible to prevent a short circuit in the power generation element 40.

When the power generation element 40 is viewed in a plan view from the stacking direction, the second bonding portion 62 has such a size that covers the edge portion 40b of the outermost layer 40a of the power generation element 40. The edge portion 40b of the power generation element 40 is prevented from biting into the inner side 50a of the exterior member 50, and the exterior member 50 can be protected from the edge portion 40b of the power generation element 40.

Furthermore, when the power generation element 40 is viewed in a plan view from the stacking direction, the second bonding portion 62 has such a size that the outer peripheral edge 62a of the second bonding portion 62 is positioned inside the joint portion 52 without being sandwiched by the joint portion 52. There is no need to provide a space for joining the outer peripheral edge 62a of the second bonding portion 62 and the exterior member 50 inside the exterior member 50. Therefore, the ratio of the volume of the power generation element 40 to the volume of the exterior member 50 is increased, and the volume energy density representing the output energy per unit volume of the unit cell 100 is improved.

The second bonding portion 62 has a frame shape when the power generation element 40 is viewed in a plan view from the stacking direction. The material cost can be reduced by adopting the frame shape instead of a surface shape.

In the battery module 200 of the present embodiment, the uppermost unit cell 100 and the lowermost unit cell 100 are bonded to the holding member 110 by the third bonding portions 133. Thus, as for the uppermost unit cell 100 and the lowermost unit cell 100, when the battery module 200 receives an impact, the positions of the unit cells 100 with respect to the holding member 110 can be prevented from being shifted laterally beyond an allowable dimension. In the battery module 200, the unit cells 100 are bonded to each other by the fourth bonding portions 134. Thus, when the battery module 200 receives an impact, as for the unit cells 100 other than the uppermost unit cell and the lowermost unit cell, the positions of the unit cells 100 with respect to the holding member 110 can be prevented from being shifted laterally beyond the allowable dimension. Furthermore, when the stacked battery 100 is viewed in a plan view from the stacking direction, the second bonding portions 62 bond the outermost layers 40a of the power generation element 40 and the inner side 50a of the exterior member 50 in a region that does not overlap with the region where the pressing part 120 and the third bonding portions 133 are present. Moreover, when the unit cells 100 are viewed in a plan view from the stacking direction, the second bonding portions 62 bond the outermost layers 40a of the power generation element 40 and the inner side 50a of the exterior member 50 in a region that does not overlap with the region where the fourth bonding portions 134 are present. By adopting such an arrangement relationship, the pressing force applied to the unit cells 100 by the pressing part 120 becomes uniform. As a result, the localization of a reaction is prevented. It is possible to prevent a decrease in battery performance and a decrease in cycle lifespan.

The thickness of the second bonding portions 62 in the stacking direction is smaller than the thickness of the third bonding portions 133 in the stacking direction. The holding member 110 (the upper holding member 111 and the lower holding member 112) does not make contact with the bulge 53 of the exterior member 50. There is no possibility that the pressing force applied to the unit cells 100 is locally increased. Furthermore, the thickness of the second bonding portions 62 in the stacking direction is smaller than ½ of the thickness of the fourth bonding portions 134 in the stacking direction. The adjacent unit cells 100 do not make contact with each other at the portion of the bulge 53 of the exterior member 50. There is no possibility that the pressing force applied to the unit cells 100 by the pressing part 120 becomes non-uniform.

As described above, the unit cell 100 of the present embodiment includes the power generation element 40, the exterior member 50, the second bonding portions 62 that bonds the outermost layers 40a of the power generation element 40 and the inner side 50a of the exterior member 50. When the power generation element 40 is viewed in a plan view from the stacking direction, the second bonding portion 62 is located in a region outside the power generation region 42, and has such a shape that the outer peripheral edge 62a of the second bonding portion 62 is continuous over the entire circumference.

With this configuration, even if the electrolytic solution in the exterior member 50 flows, the foreign substance mixed into the exterior member 50 does not move to the power generation region 42 between the outermost layer 40a of the power generation element 40 and the inner side 50a of the exterior member 50. Therefore, even when a situation occurs in which a foreign substance moves along with the flow of the electrolytic solution after the short-circuit inspection, it is possible to prevent a short circuit in the power generation element 40 between the outermost layer 40a of the power generation element 40 and the inner side 50a of the exterior member 50.

The exterior member 50 includes the joint portion 52 where the peripheral edge portions 51 are overlapped and joined. When the power generation element 40 is viewed in a plan view from the stacking direction, the second bonding portions 62 have such a size that covers the edge portions 40b of the outermost layers 40a of the power generation element 40.

With this configuration, the exterior member 50 can be protected from the edge portions 40b of the power generation element 40.

When the power generation element 40 is viewed in a plan view from the stacking direction, the second bonding portions 62 have a size such that the outer peripheral edges 62a of the second bonding portions 62 are positioned inside the joint portion 52 without being sandwiched by the joint portion 52.

With such a configuration, there is no need to provide a space for joining the outer peripheral edges 62a of the second bonding portions 62 and the exterior member 50 inside the exterior member 50, which leads to an increase in volume energy density. As a result, it is possible to provide the unit cell 100 capable of increasing the volume energy density while preventing occurrence of a short circuit in the power generation element 40 for a long time even when the electrolytic solution flows.

The second bonding portions 62 have a frame shape when the power generation element 40 is viewed in a plan view from the stacking direction.

With such a configuration, the material cost of the second bonding portions 62 can be reduced compared with a case where the second bonding portions 62 have a surface shape.

The second bonding portions 62 include, for example, bonding agents, adhesives or double-sided tapes.

With such a configuration, the outermost layers 40a of the power generation element 40 and the inner side 50a of the exterior member 50 can be bonded using an appropriate material.

The unit cell 100 includes the first bonding portions 61 that bond the electrodes 10 and 20 and the separators 30.

With such a configuration, even if the electrolytic solution in the exterior member 50 flows, the foreign substance mixed into the exterior member 50 does not move to the power generation region 42 between the electrodes 10 and 20 and the separators 30. Therefore, even when a situation occurs in which a foreign substance moves along with the flow of the electrolytic solution after the short-circuit inspection, it is possible to prevent a short circuit in the power generation element 40.

The first bonding portions 61 are formed on at least one surface of the separator base material 31 and are formed of the bonding layer 32 containing a bonding material.

With such a configuration, the electrodes 10 and 20 and the separators 30 can be bonded using the bonding separators 30, and the stacking operation when manufacturing the power generation element 40 can be easily performed.

The battery module 200 of the present embodiment is a battery module 200 including at least one unit cell 100, and includes the holding member 110, the pressing part 120 and the third bonding portions 133 that bond the unit cell 100 to the holding member 110. When the stacked battery 100 is viewed in a plan view from the stacking direction, the second bonding portions 62 bond the outermost layers 40a of the power generation element 40 and the inner side 50a of the exterior member 50 in a region that does not overlap with the region where the pressing part 120 and the third bonding portions 133 are present.

With such a configuration, it is possible to provide a battery module 200 including the unit cell 100 that can prevent a short circuit in the power generation element 40 even when a situation occurs in which a foreign substance moves along with the flow of the electrolytic solution. Since the second bonding portions 62 exist in the region that does not overlap with the region where the pressing part 120 and the third bonding portions 133 are present, the pressing force applied to the unit cell 100 can be made uniform.

The third bonding portions 133 include, for example, bonding agents, adhesives or double-sided tapes.

With such a configuration, the unit cell 100 and the holding member 110 can be bonded using an appropriate material.

The thickness of the second bonding portions 62 in the stacking direction is smaller than the thickness of the third bonding portions 133 in the stacking direction.

With such a configuration, the holding member 110 does not make contact with the bulge 53 of the exterior member 50. This makes it possible to prevent the pressing force applied to the unit cells 100 from being locally increased.

The battery module 200 further includes the fourth bonding portions 134 that bond the unit cells 100 sandwiched by the holding member 110. When the stacked battery 100 is viewed in a plan view from the stacking direction, the second bonding portions 62 bond the outermost layers 40a of the power generation element 40 and the inner side 50a of the exterior member 50 in a region that does not overlap with the region where the fourth bonding portions 134 are present.

With such a configuration, the second bonding portions 62 exist in the region which does not overlap with the region where the fourth bonding portions 134 are present. Therefore, the pressing force applied to the unit cells 100 can be made uniform.

The fourth bonding portions 134 include, for example, bonding agents, adhesives or double-sided tapes.

With such a configuration, the unit cells 100 can be bonded to each other using an appropriate material.

The thickness of the second bonding portions 62 in the stacking direction is smaller than ½ of the thickness of the fourth bonding portions 134 in the stacking direction.

With such a configuration, the adjacent unit cells 100 do not make contact with each other at the portion of the bulge 53 of the exterior member 50. This makes it possible to prevent the pressing force applied to the unit cells 100 from being non-uniform by the pressing part 120.

(Modification of Unit Cell 100)

Figure 7:
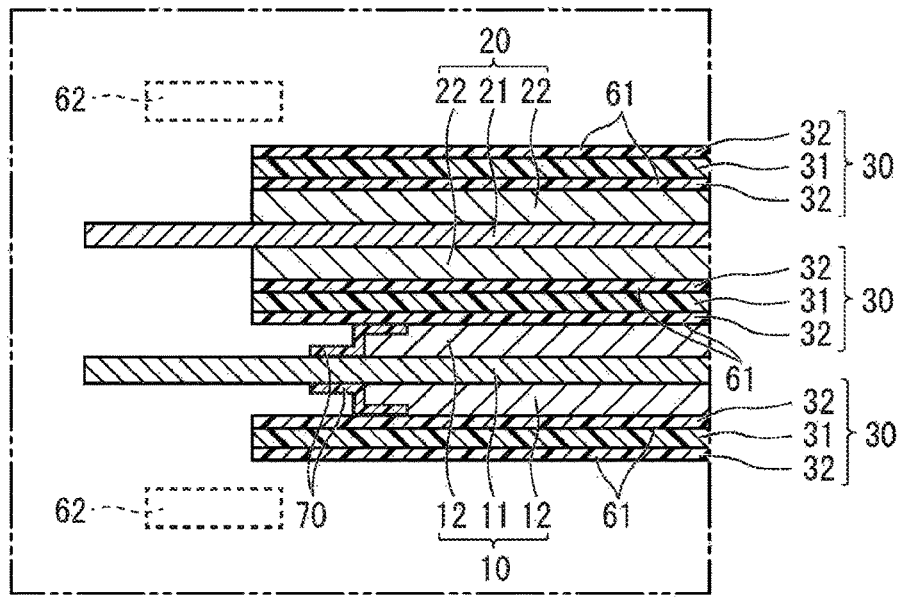
FIG. 7 is a sectional view of a main part showing a modification of the stacked battery.

FIG. 7 is a sectional view of a main part showing a modification of the stacked battery 100. In FIG. 7, the positions where the second bonding portions 62 are disposed are indicated by broken lines.

The power generation element 40 of the unit cell 100 shown in FIG. 7 has an insulating member 70 disposed between the positive electrode 10 and the negative electrode 20 among the electrodes 10 and 20. The insulating member 70 is provided to prevent an internal short circuit between the positive electrode 10 and the negative electrode 20 in the unit cell 100. The insulating member 70 is provided in the portion of the positive electrode 10 that faces the negative electrode 20 through the separator 30, more specifically, in the portion from the positive electrode active material layer 12 on the positive electrode current collector 11 to the exposed portion of the positive electrode current collector 11. The shape of the insulating member 70 is not particularly limited. The insulating member 70 is formed from an insulating tape, a coating layer of an insulating material, or the like. A thermoplastic resin such as polyethylene (PE) or polypropylene (PP) is used as the base material of the insulating member 70.

When the power generation element 40 is viewed in a plan view from the stacking direction, the second bonding portions 62 bond the outermost layers 40a of the power generation element 40 and the inner side 50a of the exterior member 50 in a region that does not overlap with the region where the insulating member 70 is present.

With such a configuration, the thickness dimension of the unit cell 100 in the stacking direction does not become large. As a result, when a plurality of unit cells 100 is stacked to form a module, the volume of the stacked cell group is not increased and the volume efficiency is improved.

(Modification of First Bonding Portion 61)

Figure 8:
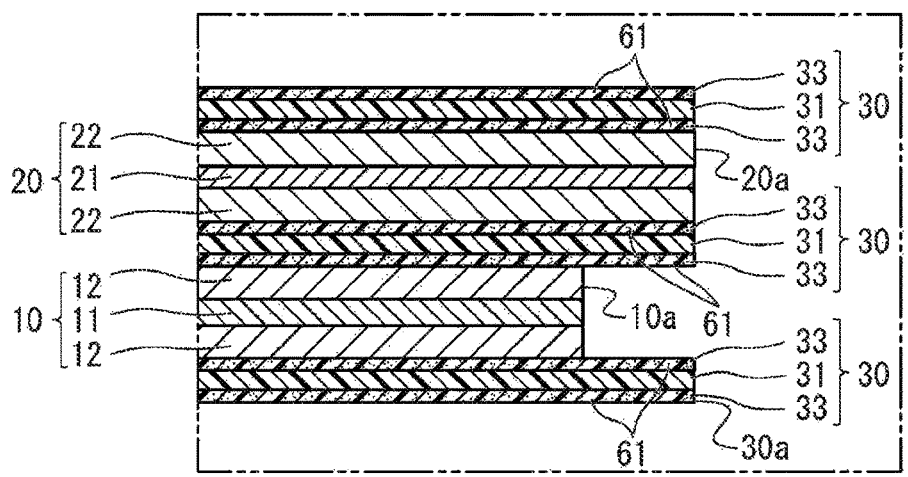
FIG. 8 is an enlarged sectional view showing a main part of the power generation element, which corresponds to FIG. 5.

FIG. 8 is an enlarged sectional view showing a main part of the power generation element 40. FIG. 8 corresponds to FIG. 5.

The constituent material of the first bonding portions 61 is not limited as long as it can bond the electrodes 10 and 20 and the separators 30. A modification of the first bonding portions 61 may be configured by, for example, a bonding layer 33 formed on at least one surface of the separator base material 31 and containing a bonding material and a heat-resistant material. The bonding layer 33 is provided over the entire surface or a part of the surface of the separator base material 31. The same material as the separator 30 of the embodiment may be used as the separator base material 31 and the bonding material. Alumina powder, a binder for binding the alumina powder, or the like is used as the heat-resistant material.

As described above, the first bonding portions 61 are configured by the bonding layer 33 formed on at least one surface of the separator base material 31 and containing a bonding material and a heat-resistant material.

With such a configuration, the electrodes 10 and 20 and the separators 30 can be bonded using the separators 30 having adhesiveness and heat resistance, and the stacking operation when manufacturing the power generation element 40 having improved heat resistance can be easily performed.

(Other Modifications)

Although the battery module 200 in which the unit cells 100 are sandwiched by the holding member 110 has been described, the present disclosure is not limited to this case. The present disclosure may also be applied to a battery module 200 in which one unit cell 100 is sandwiched by the holding member 110. In this case, it is needless to say that the third bonding portions 133 for bonding the unit cells 100 to the holding member 110 exist, but the fourth bonding portions 134 for bonding the unit cells 100 to each other do not exist.

When the pressing part 120 is configured by the camber-shaped bulging portion 121, the bulging portion 121 may be provided only in at least one of the upper holding member 111 and the lower holding member 112. Although there is shown the case where the bulging portion 121 is provided on the upper holding member 111, the bulging portion 121 may be provided only on the lower holding member 112. Bulging portions 121 may be provided on both the upper holding member 111 and the lower holding member 112.

The pressing part 120 is not limited to the case where the holding member 110 includes the camber-shaped bulging portion 121. For example, a sheet member provided with a leaf spring portion or a sheet member formed of an elastic material may be interposed between the holding member 110 and the unit cell 100 or between the unit cells 100, thereby forming the pressing part 120.

This application is based on Japanese Patent Application No. 2017-177132 filed on Sep. 14, 2017, the entire disclosure of which is incorporated herein by reference.

EXPLANATION OF REFERENCE NUMERALS

10: positive electrode (electrode), 10a: outer peripheral edge, 11: positive electrode current collector, 12: positive electrode active material layer, 13: positive electrode tab, 20: negative electrode (electrode), 20a: outer peripheral edge, 21: negative electrode current collector, 22: negative electrode active material layer, 23: negative electrode tab, 30: separator, 30a: outer peripheral edge, 31: separator base material (base material of separator), 32: bonding layer, 33: bonding layer, 40: power generation element, 40a: outermost layer, 41: unit cell layer, 42: power generation region (effective region contributing to power generation), 50: exterior member, 50a: inner side of exterior member, 51: peripheral edge portion, 52: joint portion, 53: bulge, 61: first bonding portion (additional bonding portion), 62: second bonding portion (bonding portion), 62a: outer peripheral edge, 70: insulating member, 100: stacked battery or unit cell, 110: holding member, 111: upper holding member, 112: lower holding member, 120: pressing part, 121: bulging portion, 122: pressing surface, 123: inclined surface, 133: third bonding portion (module bonding portion), 134: fourth bonding portion (additional module bonding portion), 200: battery module

What is claimed is:

1. A stacked battery, comprising:
a power generation element in which a plurality of electrodes and a plurality of separators are alternately stacked;
an exterior member in which the power generation element is accommodated together with an electrolytic solution, and which has a joint portion in which peripheral edge portions of the exterior member are overlapped and joined; and
a bonding portion configured to bond an outermost layer of the power generation element and an inner side of the exterior member,
wherein when the power generation element is viewed in a plan view from a stacking direction in which the electrodes and the separators are stacked, the bonding portion is located outside an effective region contributing to power generation in the power generation element and has a shape in which an outer peripheral edge of the bonding portion is continuous over an entire circumference of the bonding portion, and
wherein when the power generation element is viewed in the plan view from the stacking direction, the bonding portion has a size such that the bonding portion covers an edge portion of the outermost layer of the power generation element.

2. The stacked battery of claim 1, wherein when the power generation element is viewed in the plan view from the stacking direction, the bonding portion has a size such that the outer peripheral edge of the bonding portion is positioned inside the joint portion without being sandwiched by the joint portion.

3. The stacked battery of claim 1, wherein the power generation element includes an insulating member disposed between a positive electrode and a negative electrode among the electrodes, and
when the power generation element is viewed in the plan view from the stacking direction, the bonding portion bonds the outermost layer of the power generation element and the inner side of the exterior member in a region that does not overlap with a region in which the insulating member is present.

4. The stacked battery of claim 1, wherein when the power generation element is viewed in the plan view from the stacking direction, the bonding portion has a frame shape.

5. The stacked battery of claim 1, wherein the bonding portion includes a bonding agent, an adhesive, or a double-sided tape.

6. The stacked battery of claim 1, further comprising an additional bonding portion configured to bond the electrodes and the separators.

7. The stacked battery of claim 6, wherein the additional bonding portion is formed on at least one surface of a base material of each of the separators and includes a bonding layer containing a bonding material.

8. The stacked battery of claim 6, wherein the additional bonding portion is formed on at least one surface of a base material of each of the separators and includes a bonding layer containing a bonding material and a heat-resistant material.

9. A battery module including at least one stacked battery of claim 1, comprising:
a holding member configured to sandwich and hold the stacked battery from both sides in the stacking direction;
a pressing part configured to apply a pressing force to the stacked battery in the stacking direction; and
a module bonding portion configured to bond the stacked battery to the holding member,
wherein when the stacked battery is viewed in the plan view from the stacking direction, the bonding portion bonds the outermost layer of the power generation element and the inner side of the exterior member in a region that does not overlap with a region in which the pressing part and the module bonding portion are present.

10. The battery module of claim 9, wherein the module bonding portion includes a bonding agent, an adhesive, or a double-sided tape.

11. The battery module of claim 9, wherein a thickness of the bonding portion in the stacking direction is smaller than a thickness of the module bonding portion in the stacking direction.

12. The battery module of claim 9, wherein a plurality of stacked batteries is sandwiched by the holding member,
the battery module further comprises an additional module bonding portion configured to bond the stacked batteries to each other, and
when the stacked battery is viewed in the plan view from the stacking direction, the bonding portion bonds the outermost layer of the power generation element and the inner side of the exterior member in a region that does not overlap with a region in which the additional module bonding portion is present.

13. The battery module of claim 12, wherein the additional module bonding portion includes a bonding agent, an adhesive, or a double-sided tape.

14. The battery module of claim 12, wherein a thickness of the bonding portion in the stacking direction is smaller than a half of a thickness of the additional module bonding portion in the stacking direction.

* * * * *